(12) United States Patent
Venkataraman et al.

(10) Patent No.: US 10,417,093 B2
(45) Date of Patent: Sep. 17, 2019

(54) METHODS FOR PROVIDING GLOBAL SPARE DATA STORAGE DEVICE MANAGEMENT AND DEVICES THEREOF

(71) Applicant: NetApp, Inc., Sunnyvale, CA (US)

(72) Inventors: Nandhini Venkataraman, Krishnagiri (IN); Bharath Kumar, Bangalore (IN); Raymond Sinnappan, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 142 days.

(21) Appl. No.: 15/154,506

(22) Filed: May 13, 2016

(65) Prior Publication Data

US 2017/0329672 A1 Nov. 16, 2017

(51) Int. Cl.
*G06F 11/00* (2006.01)
*G06F 11/10* (2006.01)
*G06F 11/20* (2006.01)

(52) U.S. Cl.
CPC ...... *G06F 11/1088* (2013.01); *G06F 11/2092* (2013.01)

(58) Field of Classification Search
CPC ............ G06F 11/1088; G06F 11/0709; G06F 11/0727
See application file for complete search history.

(56) References Cited

U.S. PATENT DOCUMENTS

| | | | | |
|---|---|---|---|---|
| 6,598,174 B1 * | 7/2003 | Parks | .................... | G06F 11/008 711/162 |
| 6,986,075 B2 * | 1/2006 | Ackaret | ................ | G06F 11/008 714/4.5 |
| 7,506,201 B2 * | 3/2009 | Kubo | .................. | G06F 11/1092 714/6.2 |
| 7,664,913 B2 | 2/2010 | Cassell et al. | | |
| 8,635,493 B2 * | 1/2014 | Ziskind | .............. | G06F 11/1484 714/13 |
| 8,695,012 B2 * | 4/2014 | Kanso | ................... | G06F 9/5083 714/4.1 |
| 9,100,293 B2 * | 8/2015 | Ziskind | .............. | G06F 11/1484 |
| 9,104,466 B2 * | 8/2015 | Kanso | ...................... | G06F 9/46 |
| 9,342,417 B2 * | 5/2016 | Usgaonkar | .......... | G06F 11/2064 |
| 9,454,416 B2 * | 9/2016 | Veluswamy | .......... | G06F 11/008 |
| 9,465,548 B1 * | 10/2016 | Hrischuk | ............. | G06F 11/3452 |
| 9,658,778 B2 * | 5/2017 | Faulkner | ................. | G06F 3/061 |
| 9,684,562 B2 * | 6/2017 | Bell | .................... | G06F 11/1438 |
| 2007/0220318 A1 * | 9/2007 | Kalos | .................. | G06F 11/2094 714/13 |
| 2014/0013153 A1 * | 1/2014 | Chittigala | ................. | G06F 9/50 714/4.11 |

\* cited by examiner

*Primary Examiner* — Christopher S Mccarthy
(74) *Attorney, Agent, or Firm* — Pepper Hamilton LLP

(57) ABSTRACT

A method, non-transitory computer readable medium and computing device that determines in response to an event when currently owned spare data storage devices by one of a pair of storage node computing devices in a high availability pair are insufficient to satisfy a requirement for the event for one or more additional spare data storage devices having one or more data storage device parameters. One or more currently owned spare data storage devices by the other one of the storage node computing devices sufficient to satisfy the requirement are identified. The identified one or more currently owned spare data storage devices owned by the other one of the pair of storage node computing devices that satisfy the requirement are assigned to the one of the pair of storage node computing devices.

12 Claims, 4 Drawing Sheets

METHODS FOR PROVIDING GLOBAL SPARE DATA STORAGE DEVICE MANAGEMENT AND DEVICES THEREOF

FIELD

This technology generally relates to data storage networks and, more particularly, methods for providing global spare disk management and devices thereof.

BACKGROUND

In many data storage networks, storage nodes may be cooperating to provide high availability or other storage services for the storage network. As one particular example, the storage nodes may be a high availability (HA) pair of storage servers.

With these high availability (HA) pair configurations data storage networks often require one or more dedicated spare disks on each of the storage nodes even though both storage nodes in the HA pair configuration have connectivity to all disk(s). The number of spare disks required for each of the storage nodes typically depends on factors, such as media type, RPM, checksum style, and disk size.

Unfortunately, a dedicated spare disk available at one storage node in a HA pair configuration currently cannot be used for failed disk replacement by the other storage node unless manually reassigned. As a result, the unavailability of a spare disk at the storage node when needed leads to an increased duration of the degradation window. Additionally, the unavailability of a spare disk at the storage node when needed negatively impacts read performance in the HA pair configuration and makes the HA pair configuration less resilient.

DETAILED DESCRIPTION

Figure 1:
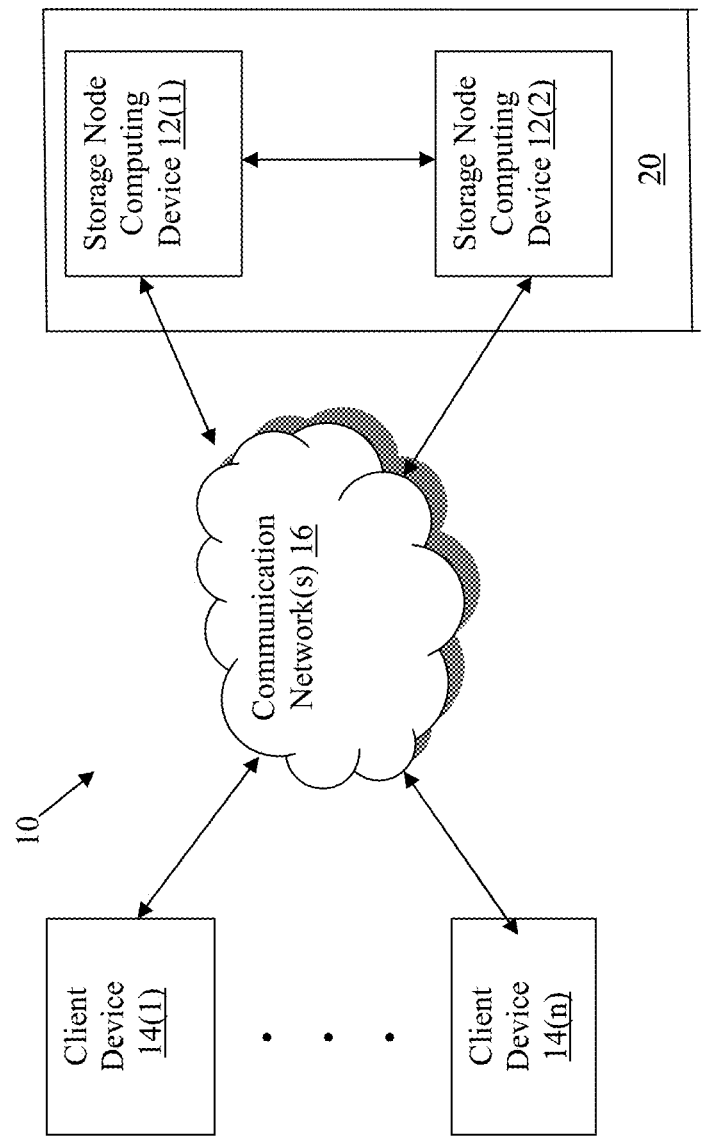
FIG. 1 is a block diagram of a network environment with an example of two storage node computing devices operating as a high availability (HA) pair and providing global spare disk management.
Figure 2:
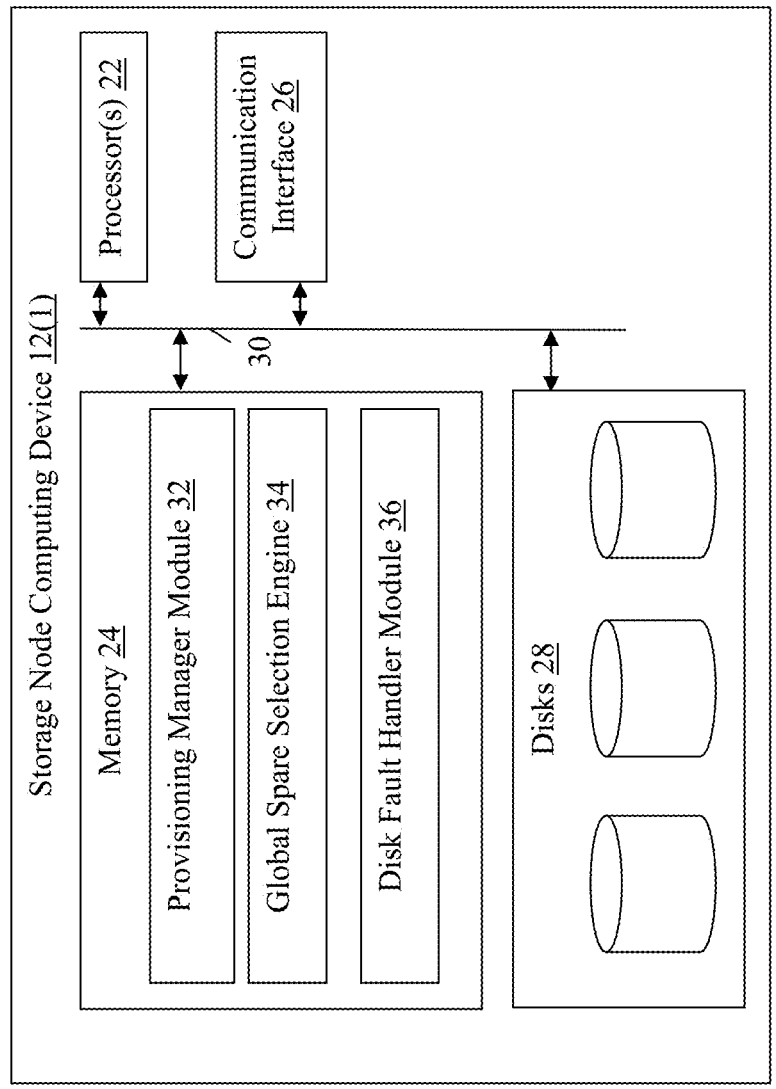
FIG. 2 is a block diagram of one of the two storage node computing devices operating as a high availability (HA) pair illustrated in FIG. 1.
Figure 4:
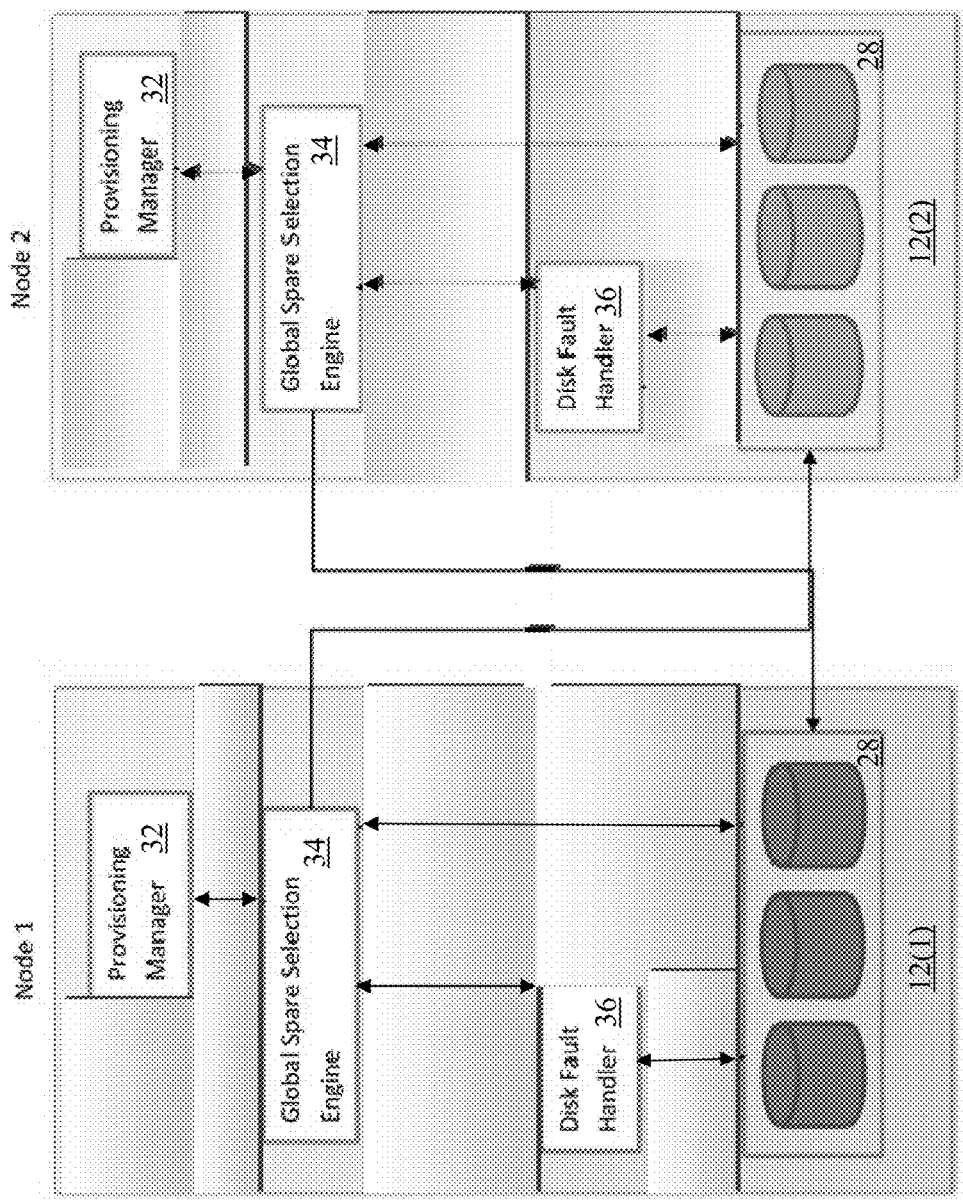
FIG. 4 is a functional block diagram of the two storage node computing devices operating as a high availability (HA) pair illustrated in FIG. 1.

A network environment 10 including exemplary storage node computing devices 12(1)-12(2) operating as a high availability (HA) pair and providing global spare disk management is illustrated in FIGS. 1-2 and 4. The storage node computing devices 12(1)-12(2) in this particular example are coupled to data storage devices 28 and to client devices 14(1)-14(n) via communication network(s) 16, although this network environment 10 can include other numbers and types of systems, devices, components, and/or elements in other configurations. Additionally, the network environment 10 may include other network devices such as one or more routers and/or switches, for example, which are well known in the art and thus will not be described herein. This technology provides a number of advantages including methods, non-transitory computer readable media, and storage node computing devices that provide effective and efficient automated global spare disk management between a high availability pair. A portion (or all) of the network environment can be located on a company's or other entities premises and/or in one or more data centers providing public, private and/or hybrid cloud comprising infrastructure, platform, and software products or services.

Referring to FIG. 2, a block diagram of one of the exemplary storage node computing device 12(1) is illustrated. In this example the storage node computing device 12(2) is the same in structure and operation, although each of the storage node computing devices 12(1)-12(2) could have other types and/or number of the systems, devices, components, and/or other elements in other configurations. The storage node computing devices 12(1)-12(2) in the high availability pair each generally provides data storage services relating to the information on the data storage devices 28, in this examples disks, on behalf of one or more of the client devices 14(1)-14(n). In this example, each of the storage node computing devices 12(1) and 12(2) includes a processor 22, a memory 24, and a communication interface 26, which are coupled together by a bus 30 or other communication link.

The processor 22 of each of the storage node computing devices 12(1) and 12(2) may execute a program of stored instructions for one or more aspects of the this technology, as described and illustrated by way of the embodiments herein, although the processor 22 could execute other numbers and types of programmed instructions. The processor 22 in the storage node computing device 12 may include one or more central processing units (CPUs) or general purpose processors with one or more processing cores, for example.

Figure 3:
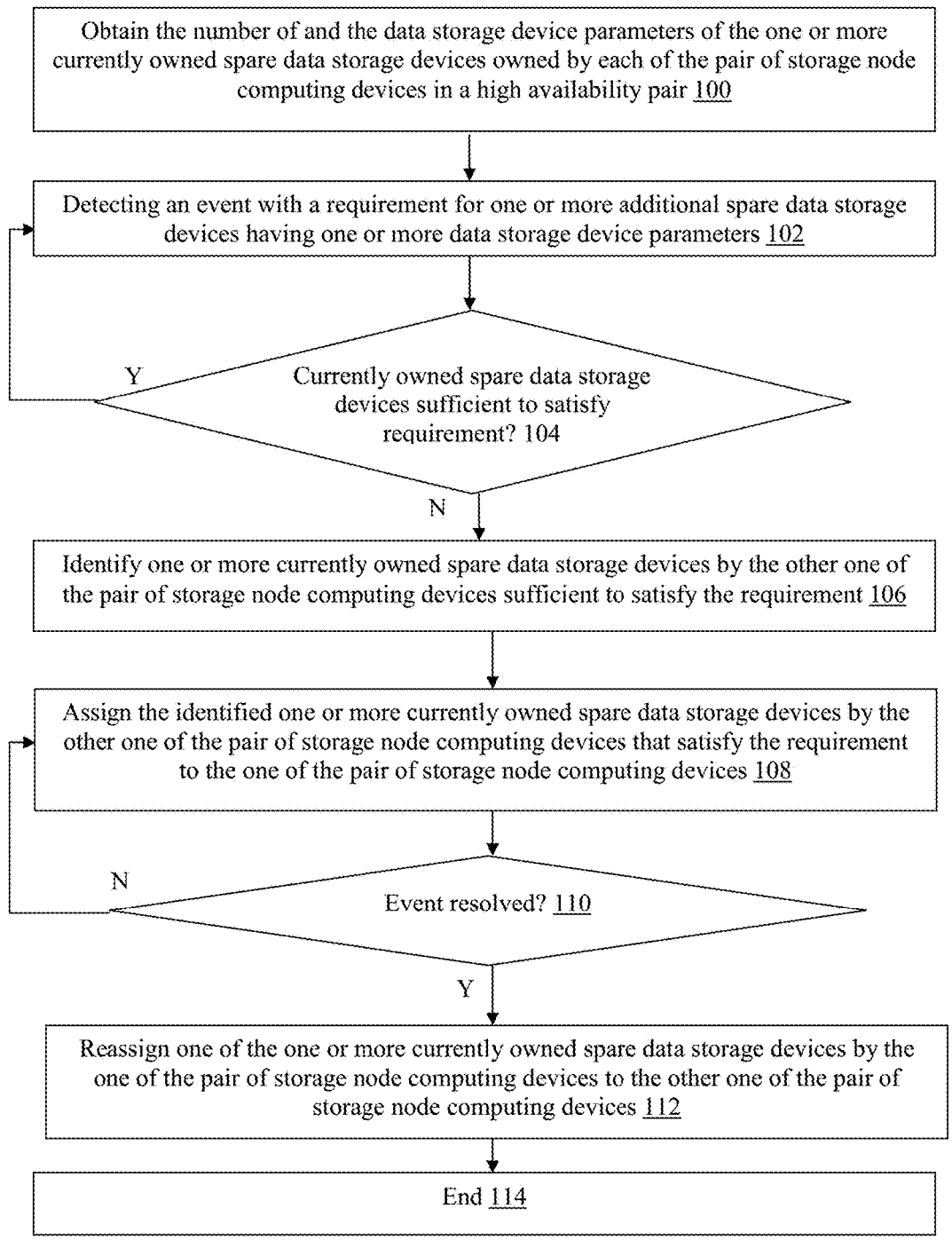
FIG. 3 is a flowchart of an example of a method for providing global spare disk management.

The memory 24 of each of the storage node computing devices 12(1) and 12(2) may include any of various forms of read only memory (ROM), random access memory (RAM), flash memory, hard disk drives(s), non-volatile or volatile memory, or the like, or a combination of such devices, for example. The memory 24 may store one or more non-transitory computer-readable instructions of this technology as illustrated and described with reference to the examples herein that may be executed by the processor 22. The exemplary flowchart and functional block diagram shown in FIGS. 3-4 are representative of example instruction(s), steps (s), and/or actions(s) of this technology that may be embodied or expressed as one or more non-transitory computer or machine readable instructions stored in memory 24 that may be executed by the processor 22.

The instruction(s), steps(s), and/or actions(s) of this technology as illustrated and/or described by way of the examples herein can be implemented as module or components of an application. Additionally, these instruction(s), steps(s), and/or actions(s) can be implemented as operating system extensions, modules, plugins, or the like. Further, these instruction(s), steps(s), and/or actions(s) may be operative in a cloud-based computing environment. These instruction(s), steps(s), and/or actions(s) also can be executed within virtual machine(s) or virtual server(s) that may be managed in a cloud-based computing environment. Also, these instruction(s), steps(s), and/or actions(s), including each of the storage node computing devices 12(1) and 12(2) themselves, may be located in virtual server(s) running in a cloud-based computing environment rather than being tied to one or more specific physical network computing devices. Further, these instruction(s), steps(s), and/or actions(s) may be running in one or more virtual machines (VMs) executing on one or more of the storage node computing devices 12(1) and 12(2).

In this example, the memory 24 also includes a provisioning manager module 32, a global spare selection engine 34, and a disk fault handler module 36, although the memory 24 can include other types and/or numbers of other applications, sets of programmed instructions, modules, and/or data.

The provisioning manager module 32 in each of the pair of storage node computing devices 12(1)-12(2) in the high availability pair may be configured to obtain the number of data storage devices and the data storage device parameters of the one or more currently owned spare data storage devices owned by each of the pair of storage node computing devices 12(1)-12(2) in the high availability pair. Additionally, the provisioning manager module 32 provided by each of the pair of storage node computing devices 12(1)-12(2) may be configured to detect an event, such as an insufficient number of one of the currently owned data storage devices of the one of the pair of storage node computing devices for an aggregate provisioning, although other types and/or numbers of could be detected. Further, the provisioning manager module 32 in each of the pair of storage node computing devices 12(1)-12(2) in the high availability pair may be configured to notify the global spare selection engine 34 in the corresponding one of the pair of storage node computing devices 12(1)-12(2) with the number of data storage devices and the one or more parameters required for the additional data storage devices that are needed, although the provisioning manager module 32 may perform other types and/or numbers of functions as illustrated and described herein The global spare selection engine 34 in each of the pair of storage node computing devices 12(1)-12(2) in the high availability pair may be configured to identify the other spare data storage devices, such as the disks 28 in this example, owned by the other one of the storage node computing devices 12(1)-12(2) that are available. Additionally, the global spare selection engine 34 in each of the pair of storage node computing devices 12(1)-12(2) in the high availability pair may be configured to determine which of the one or more other spare data storage devices, such as the disks 28 in this example, satisfy the requirement for the one or more data storage device parameters. Further, the global spare selection engine 34 in each of the pair of storage node computing devices 12(1)-12(2) in the high availability pair may be configured to assign the identified one or more other spare data storage devices, such as the disks 28 to the other one of the storage node computing devices 12(1)-12(2) with the requirement, although the global spare selection engine 34 may perform other types and/or numbers of functions as illustrated and described herein.

The disk fault handler module 36 in each of the pair of storage node computing devices 12(1)-12(2) in the high availability pair may be configured to detect an event, such as a failed disk 28, although other types and/or numbers of could be detected. Additionally, the disk fault handler module 36 in each of the pair of storage node computing devices 12(1)-12(2) in the high availability pair may be configured to notify the global spare selection engine 34 in the corresponding one of the pair of storage node computing devices 12(1)-12(2) with the number of data storage devices that failed and the one or more parameters required for replacing the data storage devices that failed, although the disk fault handler module 36 may perform other types and/or numbers of functions as illustrated and described herein.

The communication interface 26 of each of the storage node computing devices 12(1)-12(2) can include one or more network interface controllers (NICs) for operatively coupling and communicating between each of the storage node computing devices 12(1)-12(2) and the client devices 14(1)-14(n), which are coupled together by the communication network(s) 16, although other types and numbers of communication networks or systems with other types and numbers of connections and configurations to other devices and elements also can be used.

By way of example only, the communication network(s) 16 can use TCP/IP over Ethernet and industry-standard protocols, including NFS, CIFS, SOAP, XML, LDAP, and SNMP, although other types and numbers of communication networks, can be used. The communication network(s) 16 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 16 may also comprise any local area network and/or wide area network (e.g., Internet), although any other type of traffic network topologies may be used.

Each of the client devices 14(1)-14(n) in this example may include a processor, a memory, a communication interface, and optionally an input device and a display device, which are coupled together by a bus or other link, although each of the client devices 14(1)-14(n) can have other types and numbers of components or other elements and other numbers and types of network devices could be used. The client devices 14(1)-14(n) may run interface applications that provide an interface to make requests for and send content and/or data to the storage node computing device 12 via the communication network(s) 16, for example. Each of the client devices 14(1)-14(n) may be a conventional personal computer, a tablet computing device, a smart phone, a virtual machine running in a cloud, an application server hosting applications that utilize backend storage, or other processing and/or computing device, for example.

The data storage devices 28 may comprise a hard disk drives, solid state drives (SSDs), optical disk-based storage, any combination thereof, or any other type of stable, non-volatile storage suitable for storing files or objects in storage volumes for short or long term retention, for example. Additionally, in this example each of the data storage devices 28 is illustrated as being located internally in each of the storage node computing devices 12(1)-12(2), although the data storage devices 28 could be in other external locations that are coupled to each of the storage node computing devices 12(1)-12(2).

Although examples of the storage node computing devices 12(1)-12(2), client devices 14(1)-14(n), and data storage devices 28, are described and illustrated herein, it is to be understood that the devices and systems of the examples described herein are for exemplary purposes, as many variations of the specific hardware and software used to implement the examples are possible, as will be appreciated by those skilled in the relevant art(s).

One or more of the elements depicted in the network, such as the storage node computing devices 12(1)-12(2), the client devices 14(1)-14(n), and/or the data storage devices 28, for example, may be configured to operate as virtual instances on the same physical machine. In other words, one or more of the storage node computing devices 12(1)-12(2), the client devices 14(1)-14(n), and/or the data storage devices 28 illustrated in FIG. 1 may operate on the same physical device rather than as separate devices communicating through a network as depicted in FIG. 1. There may be more or fewer storage node computing devices 12(1)-12(2), client devices 14(1)-14(n), and/or data storage devices 28 than depicted in FIG. 1.

In addition, two or more computing systems or devices can be substituted for any one of the systems in any embodiment of the examples.

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

An exemplary method for providing global spare disk management will now be described with reference to FIGS. 1-4. In this example, the method will be described from the perspective of the storage node computing devices 12(1) in the high availability pair, although this example of the method would be the same for the other storage node computing devices 12(2) in the high availability pair.

Referring more specifically to FIGS. 3-4, in step 100, the storage node computing device 12(1) in the HA pair obtains the number of data storage devices, such as disk 28 by way of example, and the data storage device parameters of the one or more currently owned spare data storage devices owned by each of the pair of storage node computing devices 12(1)-12(2) in the high availability pair. In this particular example the data storage devices are disks 28, although other types and/or numbers of data storage devices may be used. Additionally in this particular example, the data storage device parameters may comprise one or more of data storage device size, RPMs, media type, and/or checksum type of all data storage devices, although other types and/or numbers of parameters may be used.

In step 102, the storage node computing device 12(1) in the HA pair determines whether an event with a requirement for one or more additional spare data storage devices having one or more data storage device parameters is detected. By way of example, the event to be detected could be an insufficient number of data storage devices, such as the disks 28, required to be owned by the storage node computing device 12(1) in the HA pair for aggregate provisioning reported by the provisioning manager module 32. By way of another example, the event to be detected could be a failure of one of the data storage devices, such as a disk in this example, reported by disk fault handler module 36, although other manners for detecting the event could be used.

In step 104, in one example the provisioning manager module 32 in the storage node computing device 12(1) in the HA pair may contact the global spare selector engine 34 with the specified number of disks and disk parameters required for the aggregate provisioning. In another example, the disk fault handler module 36 may communicates to the global spare selector engine 34 with the identification of and one or more parameters of the failed disk, although other manners for providing the number and/or parameters of the data storage devices required could be used.

Next in this step the storage node computing device 12(1) in the HA pair determines whether the currently owned one or more spare data storage devices, such as the disks 28 in this example, in the one of the storage node computing device 12(1) in the HA pair are sufficient to satisfy the obtain requirement. If the storage node computing device 12(1) in the HA pair determines the currently owned one or more spare data storage devices in the storage node computing devices 12(1) are sufficient to satisfy the requirement, then the Yes branch is taken back to step 102 as described above. If the storage node computing device 12(1) in the HA pair determines the currently owned one or more spare data storage devices in the storage node computing device 12(1) are not sufficient to satisfy the requirement, then the No branch is taken to step 106.

In step 106, the storage node computing device 12(1) in the HA pair identifies one or more currently owned spare data storage devices by the other storage node computing device 12(2) sufficient to satisfy the requirement. In this particular example, once the event is detected then the global spare selection engine 34 in the storage node computing device 12(1) in the HA pair identifies the specified number of spare data storage devices matching the given one or more disk parameters owned by the storage node computing device 12(2) in the HA pair as shown in below an example of pseudo-code.

Function in get_spares(disk, params, count)
Fetch disk_parameter of all disks from both nodes in the HA pair into disk_parameter list. for i from 1 to count.
Lookup for spare disk with matching disk_parameter.
If matching spare disk found at local node, increment matching spare count, remove from disk_parameter list.

If the other storage node computing device 12(2) does not have one or more currently owned spare data storage devices sufficient to satisfy the requirement, then this example of the method may end.

Next, in step 108, the storage node computing device 12(1) in the HA pair may assign the identified one or more currently owned spare data storage devices by the storage node computing devices 12(2) that satisfies the requirement to the storage node computing device 12(1). If the matching spare disk is found at the storage node computing devices 12(2)), then ownership of the disk is changed and assigned to the storage node computing devices 12(1).

Next, in step 110, the storage node computing device 12(1) in the HA pair may determine whether the detected event has been resolved. If the storage node computing device 12(1) in the HA pair determines the detected event has not been resolved, then the No branch is taken back to step 110 and the storage node computing devices 12(1) in the HA pair may continue to check for resolution. If after a set period of time the storage node computing device 12(1) in the HA pair determine the detected event has not been resolved or no further action is desired regarding disk reassignment, then this example of the method may end.

If the storage node computing device 12(1) in the HA pair determines the detected event has been resolved, such as a replacement of a failed disk by way of example only, then the Yes branch may be taken to step 112. In step 112, the storage node computing device 12(1) in the HA pair may rebalance by assigning one of the one or more spare data storage devices currently owned by the storage node computing devices 12(1) back to the storage node computing devices 12(2). Next, in step 114 this particular example of the method may end.

Accordingly, as illustrated and described by way of the examples herein, this technology provides a number of advantages including providing methods, non-transitory computer readable media, and storage node computing devices that provide effective and efficient automated global spare disk management between a high availability pair. With this technology, the number of spare disks in each of the storage node computing devices in a high availability pair is reduced and may comprise in some application only a single spare data storage device. As a result, data storage devices previously used for spares can be utilized for provisioning which were previously required for use as spares.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    determining, by one of a high availability pair of computing devices, in response to an event detected at a spare data storage device dedicated to the one of the computing devices is insufficient to satisfy a data storage parameter for the event, wherein the detected event comprises a detected failure of the data storage device while the computing devices of the high availability pair remain operational;
    identifying, by the one of the computing devices, a spare data storage device dedicated to the other one of the computing devices sufficient to satisfy the data storage parameter; and
    assigning, by the one of the computing devices, the identified spare data storage device dedicated to the other one of the computing devices that satisfies the data storage parameter to the one of the computing devices.

2. The method of claim 1 further comprising detecting, by the one of the computing devices, the event.

3. The method of claim 1 further comprising obtaining, by the one of the computing devices, a number and the data storage parameter of the data storage device dedicated to each of the computing devices.

4. The method of claim 1 further comprising:
    determining, by the one of the computing devices, when the event has been resolved; and
    assigning, by the one of the computing devices, the identified data storage device back to the other one of the computing devices when the event has been determined to be resolved.

5. A non-transitory machine readable medium having stored thereon instructions for performing a method comprising machine executable code which when executed by at least one machine causes the machine to:
    determine in response to an event detected at a spare data storage device dedicated to one of a high availability pair of computing devices is insufficient to satisfy a data storage parameter, wherein the detected event comprises a detected failure of the data storage device while the computing devices of the high availability pair remain operational;
    identify a spare data storage device dedicated to the other one of the computing devices sufficient to satisfy the data storage parameter; and
    assign the identified spare data storage device dedicated to the other one of the computing devices that satisfies the data storage parameter to the one of the computing devices.

6. The medium of claim 5 wherein the instructions for performing the method comprise machine executable code which when executed by at least one machine causes the machine to detect the event.

7. The medium of claim 5 wherein the instructions for performing the method comprise machine executable code which when executed by at least one machine causes the machine to obtain a number of and the data storage parameter of the data storage device dedicated to each of the computing devices.

8. The medium of claim 5 wherein the instructions for performing the method comprise machine executable code which when executed by at least one machine causes the machine to:
    determine when the event has been resolved; and
    assign the identified data storage device by the one of the computing devices to the other one of the computing devices when the event has been determined to be resolved.

9. A computing device comprising:
    a memory containing machine readable medium comprising machine executable code having stored thereon instructions for performing a method; and
    a processor coupled to the memory, the processor configured to execute the machine executable code to cause the processor to:
        determine in response to an event detected at a spare data storage device dedicated to one of a high availability pair of computing devices is insufficient to satisfy a data storage parameter, wherein the detected event comprises a detected failure of the data storage device while the computing devices of the high availability pair remain operational;
        identify a spare data storage device dedicated to the other one of the computing devices sufficient to satisfy the data storage parameter; and
        assign the identified one or more spare data storage device dedicated to the other one of the computing devices that satisfies the data storage parameter to the one of the computing devices.

10. The device of claim 9 wherein the processor is further configured to execute the machine executable code to further cause the processor to: detect the event.

11. The device of claim 9 wherein the processor is further configured to execute the machine executable code to further cause the processor to:
    obtain a number of and the data storage parameters of the data storage device dedicated to each of the computing devices.

12. The device of claim 9 wherein the processor is further configured to execute the machine executable code to further cause the processor to:
    determine when the event has been resolved; and
    assign the identified data storage device by the one of the computing devices to the other one of the computing devices when the event has been determined to be resolved.

* * * * *